United States Patent
Chukka et al.

(10) Patent No.: US 9,723,212 B2
(45) Date of Patent: Aug. 1, 2017

(54) IMAGE CAPTURE

(71) Applicant: Intel Corporation, Santa Clara, CA (US)

(72) Inventors: Ravikiran Chukka, Beaverton, OR (US); Rajesh Poornachandran, Portland, OR (US); Saurabh Dadu, Tigard, OR (US); Ashok K. Mishra, Portland, OR (US); Sheethal Bhat, Waltham, MA (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 14/229,001

(22) Filed: Mar. 28, 2014

(65) Prior Publication Data

US 2015/0281583 A1    Oct. 1, 2015

(51) Int. Cl.
*H04N 5/232* (2006.01)
*G06F 3/0346* (2013.01)

(52) U.S. Cl.
CPC ....... *H04N 5/23293* (2013.01); *G06F 3/0346* (2013.01); *H04N 5/23245* (2013.01); *G06F 2200/1614* (2013.01)

(58) Field of Classification Search
CPC .................. G09G 2340/0492; H04N 5/23222
See application file for complete search history.

(56) References Cited

U.S. PATENT DOCUMENTS

| | | | | |
|---|---|---|---|---|
| 2005/0286888 A1* | 12/2005 | Konttinen | ............... | G03B 17/18 396/374 |
| 2010/0002116 A1* | 1/2010 | Ostlund | ............... | H04N 5/232 348/308 |
| 2011/0007177 A1* | 1/2011 | Kang | ............... | H04N 5/232 348/222.1 |
| 2012/0062757 A1* | 3/2012 | Schindler | ............... | H04N 5/335 348/220.1 |
| 2013/0258044 A1* | 10/2013 | Betts-Lacroix | .... | H04N 13/0242 348/36 |
| 2015/0268757 A1* | 9/2015 | Chandran | ............... | G06F 3/044 345/174 |

* cited by examiner

*Primary Examiner* — Mekonnen Dagnew
(74) *Attorney, Agent, or Firm* — International IP Law Group, P.L.L.C.

(57) ABSTRACT

The present disclosure provides techniques for capturing an image or video. In particular, the present disclosure provides techniques for capturing the image or video using a camera integrated with a computing device, such as a cellular phone. A computing device can include an image sensor to capture image data and a processor to process the image data. The image sensor is to capture the image data in an orientation format irrespective of an orientation of the computing device.

26 Claims, 9 Drawing Sheets

500

600

700

700

IMAGE CAPTURE

TECHNICAL FIELD

The present invention relates to digital imaging. In particular, the present invention relates to techniques for capturing images using a digital camera.

BACKGROUND

Modern computing devices continue to incorporate a growing number of components. For example, modern computing devices can include an image sensor for capturing images and/or video. The image sensor can be designed to capture images most efficiently when the computing device is in landscape orientation, rather than in portrait orientation.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Current image sensors are configured to capture image data in portrait format when the device is in portrait orientation and in landscape format when the device is in landscape orientation. Image data can include still-shot data, video data, or a combination thereof. Embodiments disclosed herein provide techniques for capturing an image or video. In particular, the present disclosure provides techniques for capturing the image or video using a camera integrated with a computing device, such as a cellular phone.

Image data collected in portrait orientation appears compressed when the image data is displayed on a larger display device. By contrast, image data captured in landscape orientation is not compressed when the image data is displayed on a larger display device. Accordingly, image data capture in landscape orientation is designed to be more user friendly than in portrait orientation. While users generally prefer to capture image data in landscape format, the users often forget to rotate the computing device to landscape orientation. However, by configuring an image sensor to capture image data in landscape format irrespective of the orientation of the computing device, the image data can be captured efficiently without depending on a user to position the computing device appropriately.

Figure 1:
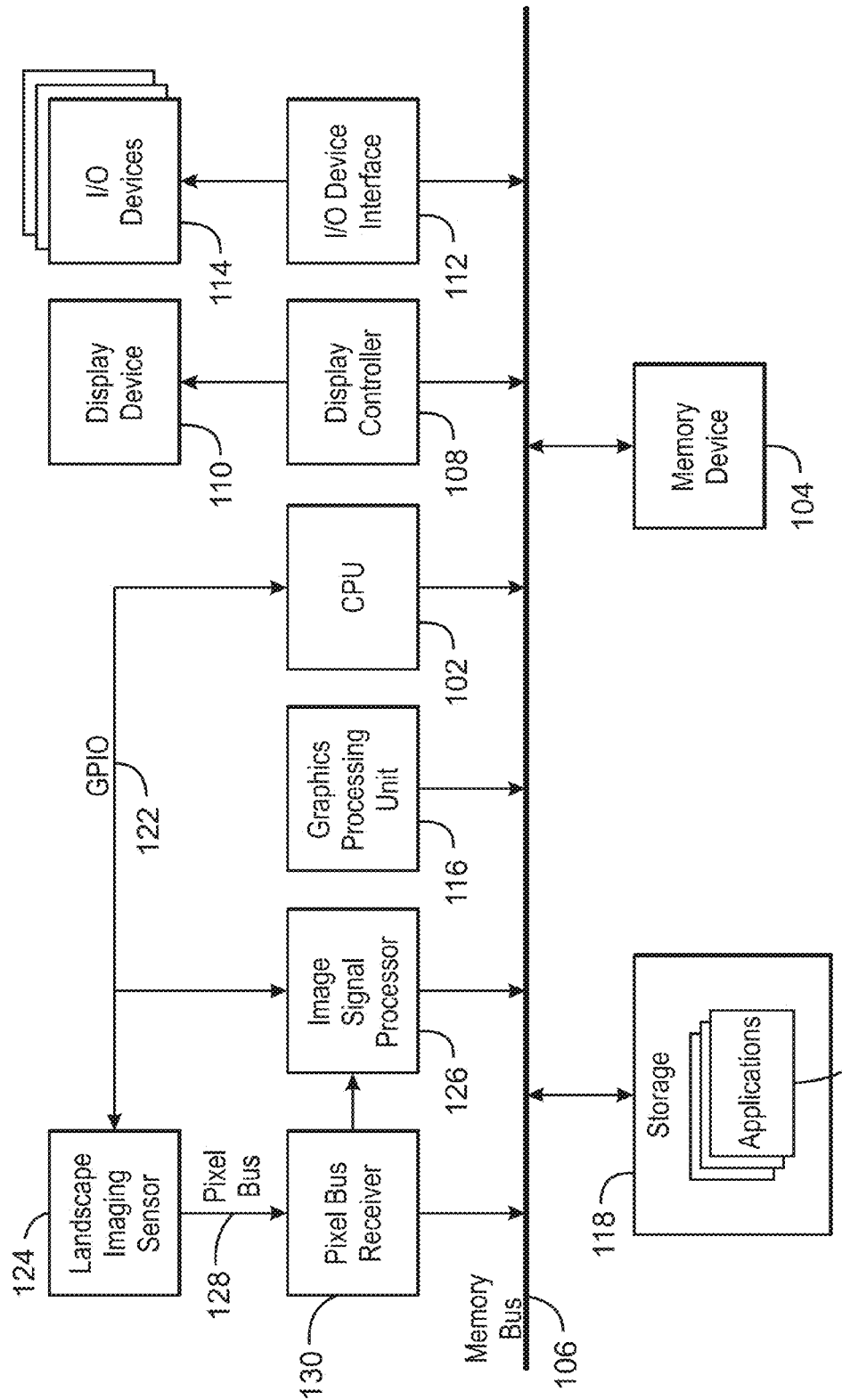
FIG. 1 is a block diagram of a computing device.

FIG. 1 is a block diagram of a computing device. The computing device 100 can be, for example, a laptop computer, tablet computer, a digital camera, or mobile device, among others. In particular, the computing device 100 can be a mobile device such as a cellular phone, a smartphone, a personal digital assistant (PDA), or a tablet. The computing device 100 can include a processor or CPU 102 that is configured to execute stored instructions, as well as a memory device 104 that stores instructions that are executable by the processor 102. The processor can be an in-line high throughput image signal processor (ISP). The ISP can enable very high speed capture at full sensor resolution. The processor 102 can be a combination of an ISP with a high performance processor, such as an atom processor. The processor 102 can be coupled to the memory device 104 by a bus 106. Additionally, the processor 102 can be a single core processor, a multi-core processor, a computing cluster, or any number of other configurations. Furthermore, the computing device 100 can include more than one processor 102. The memory device 104 can include random access memory (RAM), read only memory (ROM), flash memory, or any other suitable memory systems. For example, the memory device 104 can include dynamic random access memory (DRAM).

The processor 102 can be linked through the bus 106 to a display controller 108 configured to connect the computing device 100 to a display device 110 and to control the display device 110. The display device 110 can include a display screen that is a built-in component of the computing device 100. The display device 110 can also include a computer monitor, television, or projector, among others, that is externally connected to the computing device 100.

The processor 102 can also be connected through the bus 106 to an input/output (I/O) device interface 112 configured to connect the computing device 100 to one or more I/O devices 114. The I/O devices 114 can include, for example, a keyboard and a pointing device, wherein the pointing device can include a touchpad or a touchscreen, among others. The I/O devices 114 can be built-in components of the computing device 100, or can be devices that are externally connected to the computing device 100.

The computing device 100 can also include a graphics processing unit (GPU) 116. As shown, the CPU 102 can be coupled through the bus 106 to the GPU 116. The GPU 116 can be configured to perform any number of graphics operations within the computing device 100. For example, the GPU 116 can be configured to render or manipulate graphics images, graphics frames, videos, or the like, to be displayed to a user of the computing device 100. In some embodiments, the GPU 116 includes a number of graphics engines, wherein each graphics engine is configured to perform specific graphics tasks, or to execute specific types of workloads.

The computing device includes a storage device 118. The storage device 118 is usually a non-volatile physical memory such as flash storage, hard drive, an optical drive, a thumbdrive, a secure digital (SD) memory card, an array of drives, or any combinations thereof. The storage device 118 can also include remote storage drives. The storage device 118 can include any number of applications 120 that are configured to run on the computing device 100.

The central processor 102 or image processor can further be connected through a control bus or interface 122, such as GPIO 122, to an imaging device. The imaging device can include a landscape imaging sensor 124, designed to collect image data. For example, the landscape imaging sensor 124 can be designed to collect still-shot images, videos, or a combination thereof. The landscape imaging sensor 124 is designed to capture image data in landscape format, irrespective of the orientation of the computing device 100. For example, when the computing device 100 is in portrait orientation, the landscape imaging sensor 124 captures image data in landscape format. Additionally, when the computing device 100 is in landscape orientation, the image data is captured in landscape format. The landscape imaging sensor 124 can be any suitable shape of image sensor. For example, the landscape imaging sensor 124 can be a square sensor, a cross-shaped sensor, a circular sensor, or a rectangular sensor.

A user can determine in which orientation the image data if the image data is captured. For example, the user can determine if the image data is always captured in landscape format or always captured in portrait format, regardless of the orientation of the computing device 100, or if the image data is captured in landscape format when the computing device 100 is in landscape orientation and in portrait format when the computing device 100 is in portrait orientation. For example, the computing device 100 can include a dynamic, user-configurable capability to modify a camera sensory region to always capture images in landscape mode. In another example, the landscape imaging sensor 124 can force the landscape mode with user acknowledgement to use portrait orientation. The landscape imaging sensor 124 can capture the image data in response to a signal, such as a signal from a user. The signal can be any suitable type of signal, such as a push of a button, a selection on a touch screen, or an expiration of a predetermined period of time, among others.

The sensor can be a two-dimensional complementary metal-oxide semiconductor (CMOS) or Charge Couple Device (CCD pixel array sensor. The imaging device can produce component red, green and blue values in the case of a three sensor configuration or a raw Bayer image consisting of interleaved red, blue and green-red and green-blue values. In an example, the landscape imaging sensor 124 can have an integrated image processor and can produce ISO Y, U, and V values in a pixel format such as NV12. Other imaging sensors can be used as well. The image device can be a built-in or integrated component of the computing device 100, or can be a device that is externally connected to the computing device 100.

The image data can be transferred directly to an image signal processor 126 for processing. The landscape imaging sensor 124 can be connected through a pixel bus 128 to a pixel bus receiver 130. The image data can be received in the pixel bus receiver 130 before being transferred to the image signal processor 126.

The block diagram of FIG. 1 is not intended to indicate that the computing device 100 is to include all of the components shown in FIG. 1. Further, the computing device 100 can include any number of additional components not shown in FIG. 1, depending on the details of the specific implementation.

Figure 2:
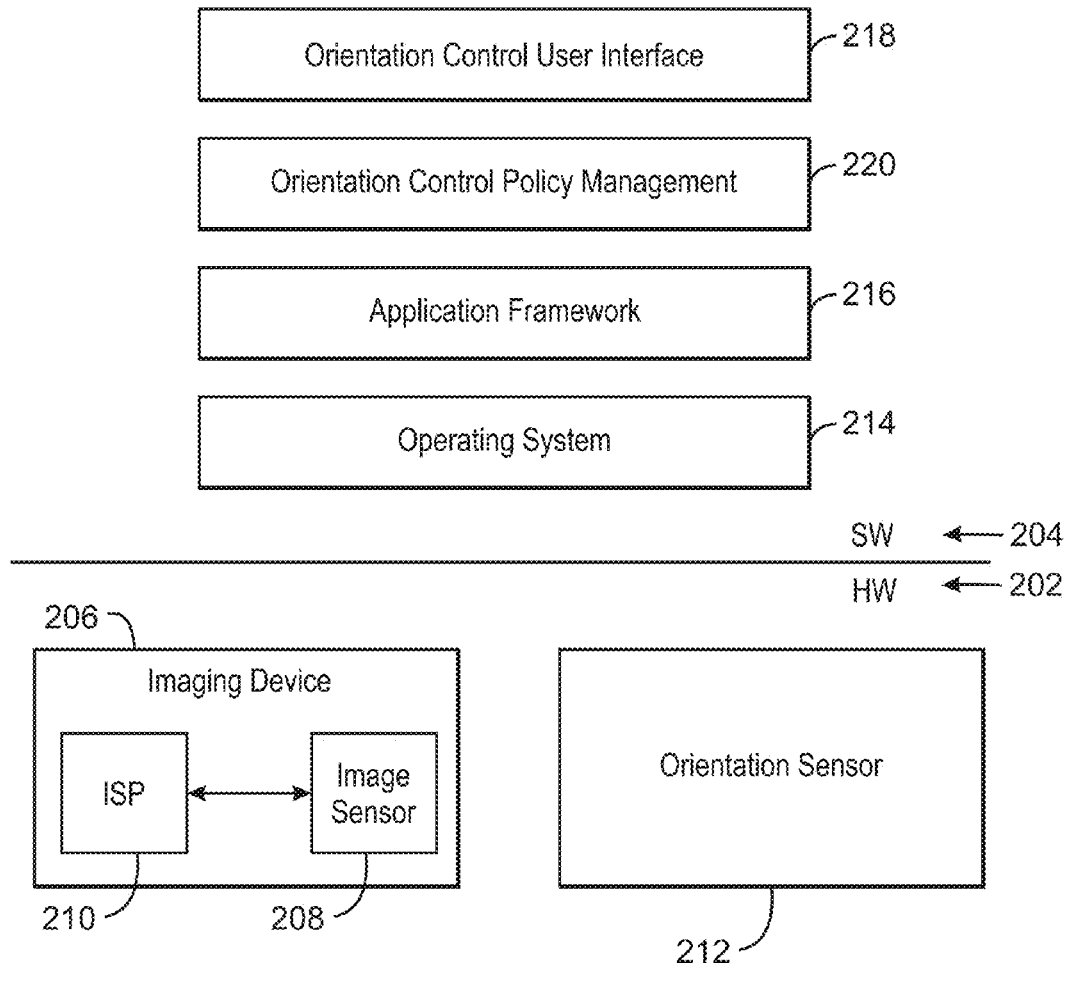
FIG. 2 is a block diagram of another computing device.

FIG. 2 is a block diagram of a computing device. The computing device 200 can include a combination of hardware 202 and software 204. The hardware 202 can include an imaging device 206 to capture images. The images can be still-shot images, videos, or a combination thereof. The imaging device 206 can include an image sensor 208 to capture image data. The image sensor 208 captures image data in landscape format, regardless of the orientation of the computing device 200. The image data captured by the image sensor 208 can be transferred to an image signal processor (ISP) 210 for processing.

The computing device 200 also includes an orientation sensor 212. The orientation sensor 212 can be any suitable type of sensor for determining an orientation of the computing device 200. For example, the orientation sensor 212 can be a gyroscope. The image sensor 208 can employ data collected by the orientation sensor 212 to capture the image data in a horizontal landscape format, regardless of the orientation of the computing device 200.

The software 204 of the computing device 200 includes an operating system 214. The software 204 also includes application framework 216. The software 204 further includes an orientation control user interface 218. The user can interact with the orientation control user interface 218 to confirm capturing the image data in landscape format. The software 204 additionally includes an orientation control policy management 220 to process the user command entered in the orientation control user interface 218.

The block diagram of FIG. 2 is not intended to indicate that the computing device 200 is to include all of the components shown in FIG. 2. Further, the computing device 200 can include any number of additional components not shown in FIG. 2, depending on the details of the specific implementation.

Figure 3:
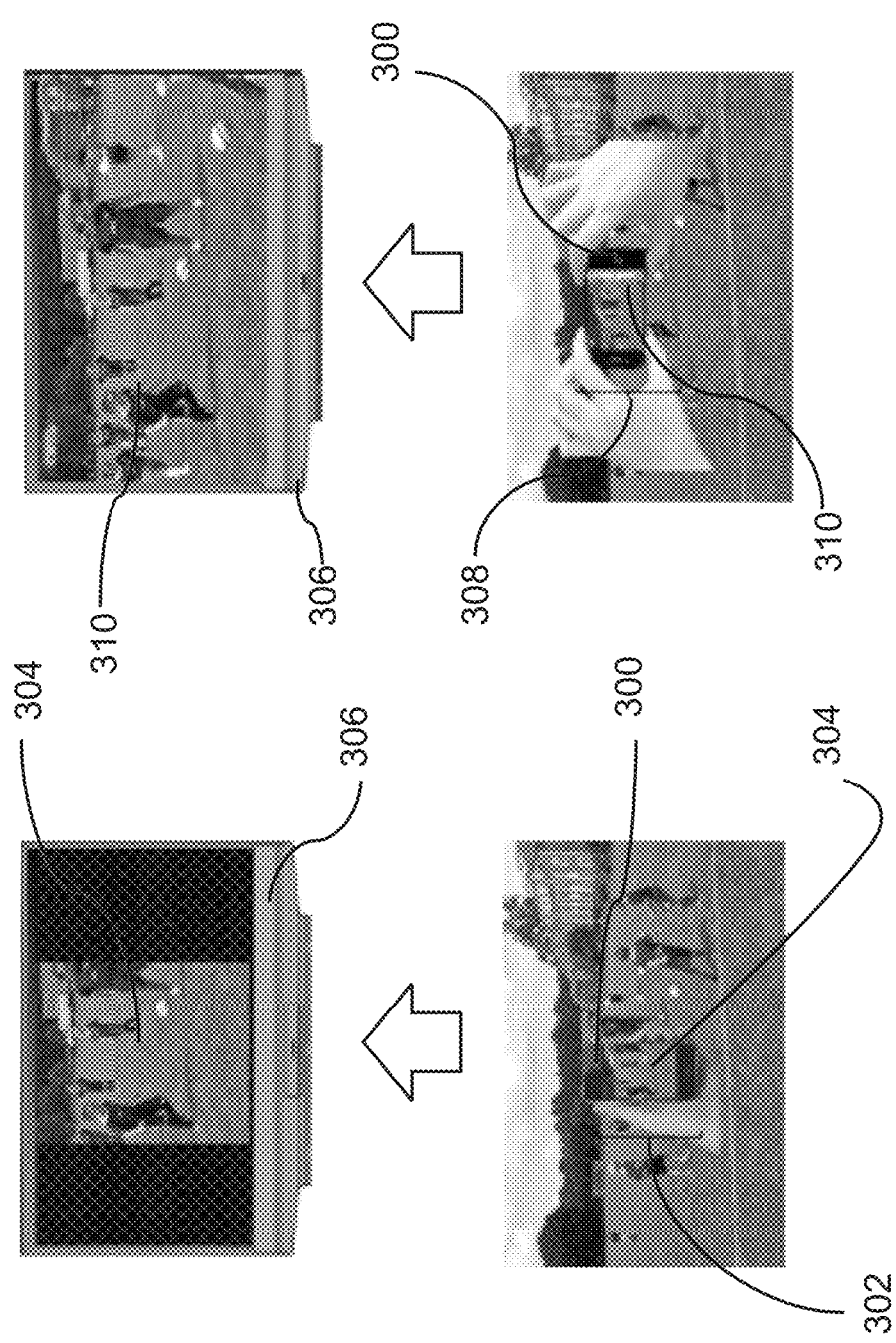
FIG. 3 is an illustration comparing portrait format and landscape format.

FIG. 3 is an illustration comparing portrait format and landscape format. When using a computing device 300 to capture an image or video, a user commonly holds the computing device 300 in portrait orientation 302 as the device 300 is easy to hold in portrait orientation 302. When a computing device 300 is in portrait orientation 302, the image sensor of the computing device 300 has a height to width ratio of 4:3. The image sensor captures an image 304. When the image 304 is replayed on a larger display device 306, the image is cropped and a portion of the larger display device 306 is unused.

When the computing device 300 is in landscape orientation 308, the image sensor of the computing device 300 has a height to width ratio of 3:4. When an image 310 captured while the device is in landscape orientation 308 is replayed on the larger display device 306, the image 310 is not cropped and no portion of the larger display screen 306 is unused. Accordingly, the imaging system on the computing device 300 has been designed to be more efficient in landscape mode than in portrait mode. However, it is more difficult and less comfortable for a user to hold the computing device 300 in landscape orientation 308. While the height to width ratio has been described here as 4:3 and 3:4, it is to be understood that additional ratios are also possible, such as 16:10, 3:2, or any other suitable ratio.

Figure 4A:
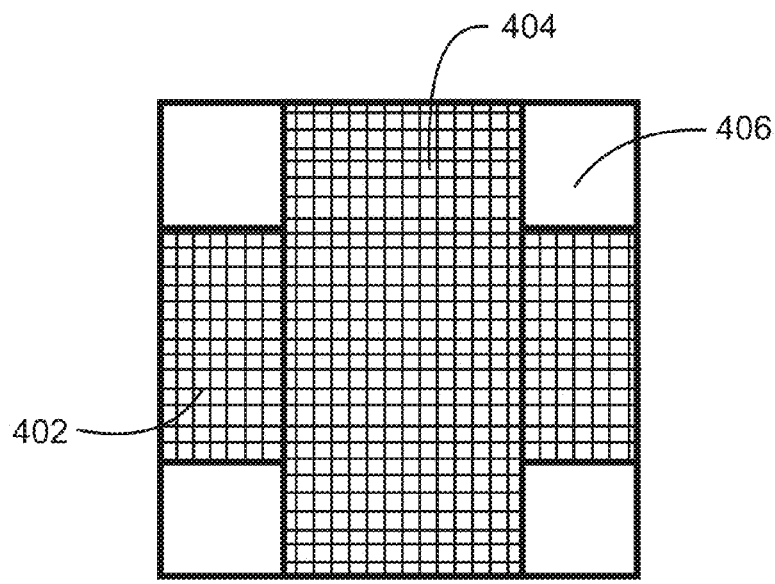
FIGS. 4A and 4B are illustrations of a square image sensor.
Figure 4B:
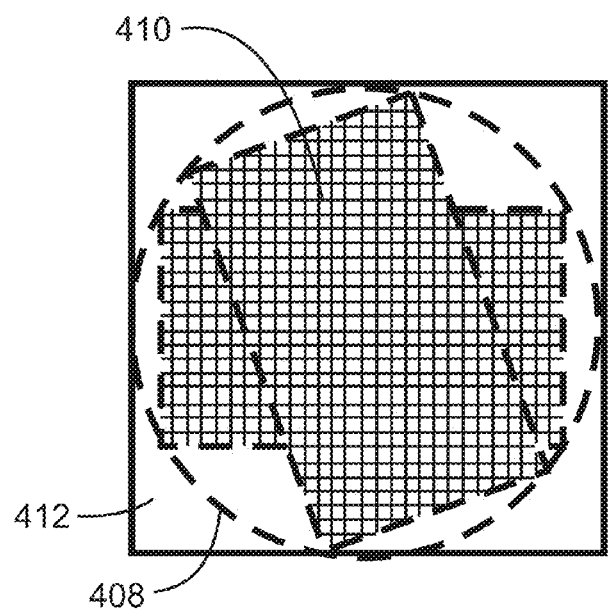

FIGS. 4A-4B are illustrations of a square image sensor. The square image sensor 400 can be dynamically configured to landscape mode. For example, the square image sensor 400 can be configured to 16:9 landscape mode, or any other suitable ratio landscape mode. As illustrated in FIG. 4A, when a computing device including the square image sensor 400 is in landscape orientation, a first portion 402 of the square image sensor 400 can be configured to capture image data in landscape mode. When the computing device is in portrait orientation, a second portion 404 of the square image sensor 400 can be configured to capture image data in landscape mode. When a first portion 402 or a second portion 404 of the square image sensor 400 is configured to capture image data, a third portion 406 of the square image sensor is unused.

In another example, illustrated by FIG. 4B, the square image sensor 400 can include a dynamic circle 408 within the square image sensor 400. A portion 410 of the square image sensor 400 can be configured to capture the image data. The portion 410 of the square image sensor 400 configured to capture the image data can rotate within the dynamic circle 408, depending on the orientation of the computing device including the square image sensor 400.

The portion 412 of the square image sensor 400 not configured to capture the image data is unused. Accordingly, the square image sensor 400 can capture image data in landscape mode irrespective of the orientation of the computing device. The user can even perform a 360 degree rotation of the computing device while capturing image data and the image sensor will capture the image data in landscape orientation. An orientation sensor of the computing device can be employed to ensure that the image data is captured in a horizontal landscape mode. No resolution is lost and the image data will playback smoothly on a display in landscape mode.

The illustrations of FIGS. 4A and 4B are not intended to indicate that the image sensor 400 is to include all of the components shown in FIGS. 4A and 4B. Further, the image sensor 400 can include any number of additional components not shown in FIGS. 4A-4B, depending on the details of the specific implementation.

Figure 5:
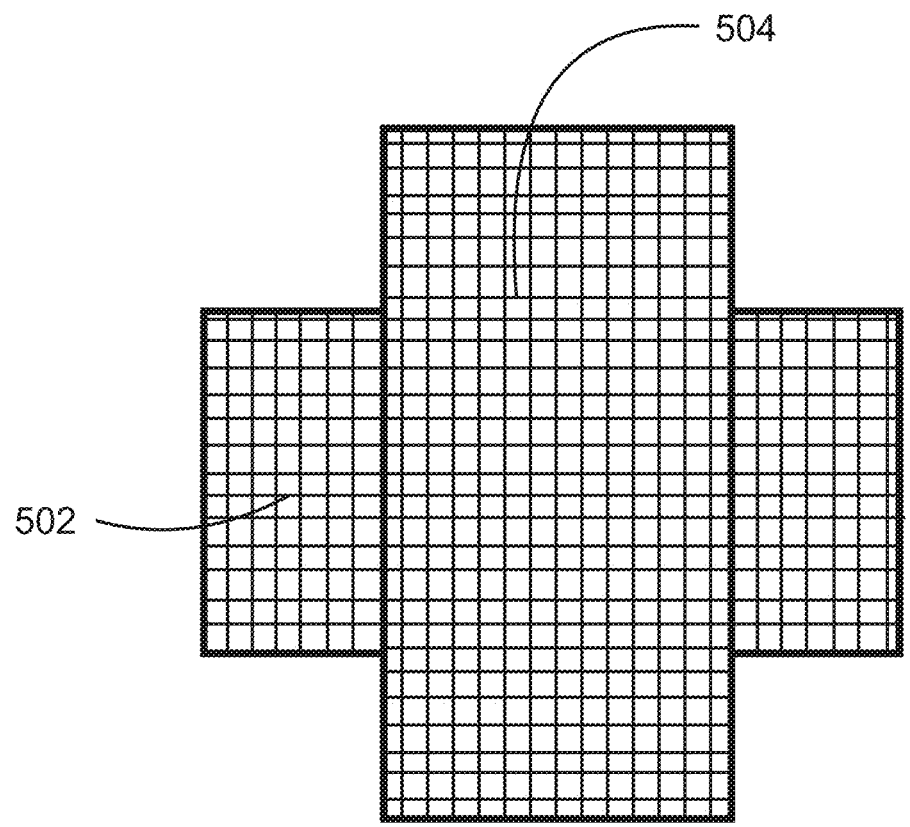
FIG. 5 is an illustration of a cross-shaped image sensor.

FIG. 5 is an illustration of an example of a cross-shaped image sensor 500. When a computing device including the cross-shaped image sensor 500 is in landscape orientation, a first portion 502 of the cross-shaped image sensor 500 can be configured to capture image data. When the computing device is in portrait orientation, a second portion 504 of the cross-shaped image sensor 500 is configured to capture image data. The cross-shaped image sensor 500 is similar to the square image sensor 400 illustrated by FIGS. 4A-4B. However, unlike with a square image sensor, less of the cross-shaped image sensor is unused. Accordingly, this cross-shaped image sensor 500 is more cost efficient than the square image sensor 400.

The illustration of FIG. 5 is not intended to indicate that the image sensor 500 is to include all of the components shown in FIG. 5. Further, the image sensor 500 can include any number of additional components not shown in FIG. 5, depending on the details of the specific implementation.

Figure 6:
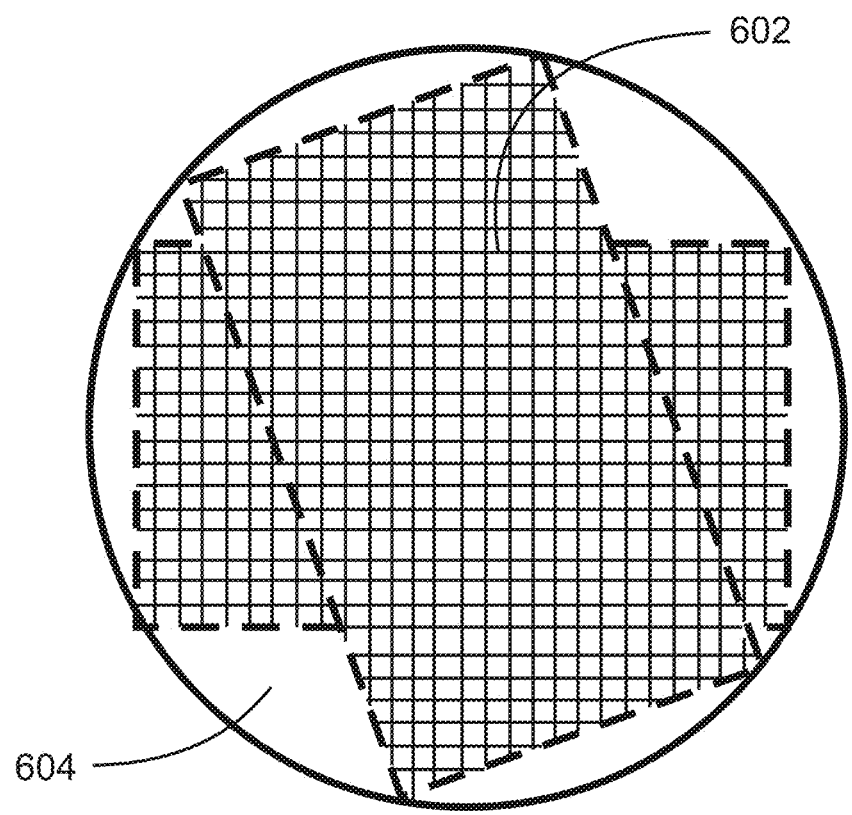
FIG. 6 is an illustration of a circular image sensor.

FIG. 6 is an illustration of an example of a circular image sensor 600. A portion 602 of the circular image sensor 600 can be configured to capture the image data. The portion 604 of the circular image sensor 600 configured to capture the image data can rotate, depending on the orientation of the computing device including the circular image sensor 600. Accordingly, the circular image sensor 600 can capture image data in landscape mode irrespective of the orientation of the computing device. The user can even perform a 360 degree rotation of the computing device while capturing image data and the image sensor will capture the image data in landscape orientation. An orientation sensor of the computing device can be employed to ensure that the image data is captured in a horizontal landscape mode. No resolution is lost and the image data will playback smoothly on a display in landscape mode.

The illustration of FIG. 6 is not intended to indicate that the image sensor 600 is to include all of the components shown in FIG. 6. Further, the image sensor 600 can include any number of additional components not shown in FIG. 6, depending on the details of the specific implementation.

Figure 7A:
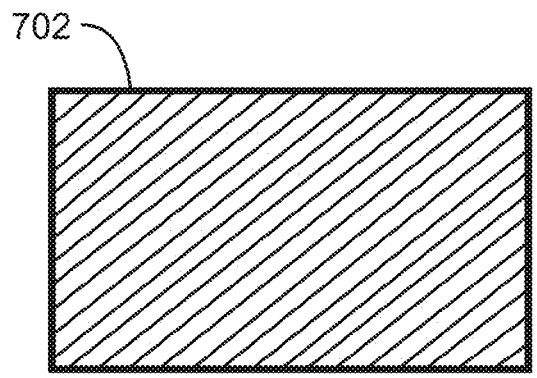
FIGS. 7A and 7B are illustrations of a rectangular image sensor.
Figure 7B:
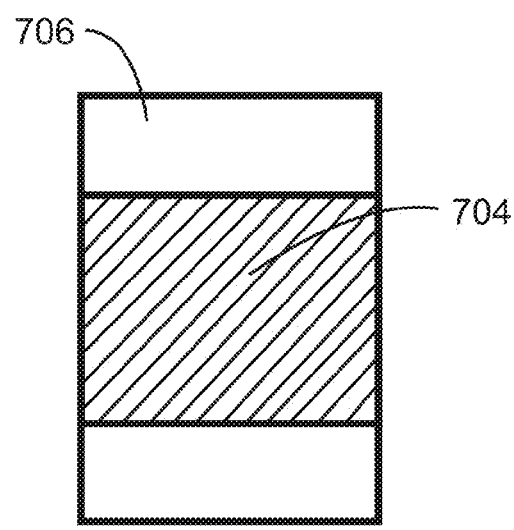

FIGS. 7A-7B are illustrations of a rectangular image sensor. The rectangular image sensor 700 can be configured to capture image data in landscape mode, regardless of the orientation of a computing device including the rectangular image sensor 700. When the computing device is in landscape orientation, illustrated by FIG. 7A, the entire 702 rectangular image sensor 700 can be configured to capture the image data. However, when the computing device is in portrait orientation, illustrated by FIG. 7B, a portion 704 of the rectangular image sensor 700 can be configured to capture the image data in landscape mode. In this portrait orientation, a portion 706 of the rectangular image sensor 700 remains unused. A small portion of the field of view (FOV) and the mega pixels are sacrificed in this approach. However, the viewing experience of the captured image data on a larger display device is improved using this approach compared to the current method of capturing image data.

The illustrations of FIGS. 7A-7B are not intended to indicate that the image sensor 700 is to include all of the components shown in FIGS. 7A-7B. Further, the image sensor 700 can include any number of additional components not shown in FIGS. 7A-7B, depending on the details of the specific implementation.

Figure 8:
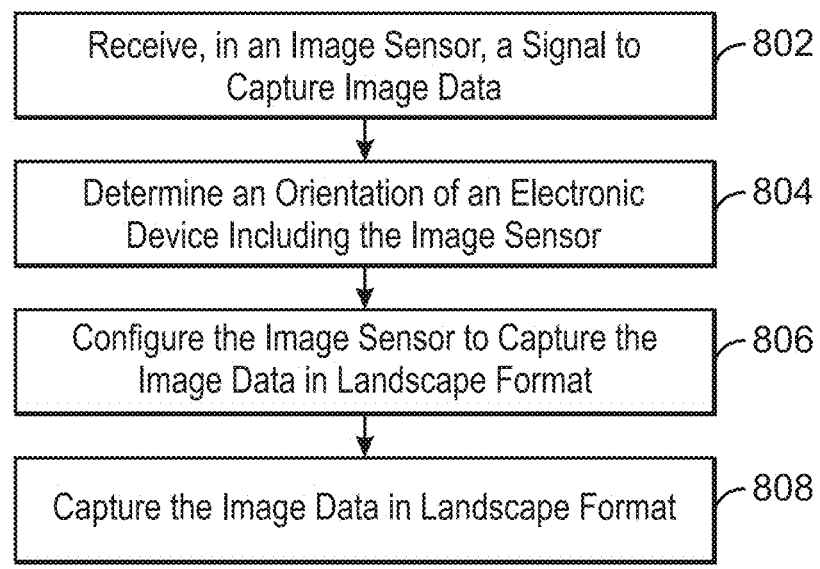
FIG. 8 is a process flow diagram of an example of a method of capturing image data.

FIG. 8 is a process flow diagram of an example of a method 800 of capturing image data. At block 802, a signal to capture image data can be received in an image sensor. The signal can be any suitable type of signal. For example, the signal can be an elapsed predetermined period of time or a push of a button, among others. The image sensor can be a sensor configured to capture image data in landscape format, regardless of an orientation of a computing device. The image sensor can be any suitable shape of sensor, such as a square sensor, a cross-shaped sensor, a circular sensor, or a rectangular sensor.

At block 804, the orientation of a computing device including the image sensor can be determined. The orientation can be determined by employing an orientation sensor. The orientation sensor can be a sensor that collects environmental data to determine the orientation. For example, the orientation sensor can be a gyroscope, or any other suitable type of sensor.

At block 806, the image sensor can be configured to capture the image data in landscape format. The image sensor can be configured based on the orientation of the computing device. For example, when the computing device is in landscape orientation, a first portion of the image sensor can be configured to capture the image data and when the computing device is in portrait orientation, a second portion of the image sensor can be configured to capture the image data. At block 808, the image data can be captured in landscape format. The image data can be captured in landscape format irrespective of the orientation of the computing device.

The process flow diagram of FIG. 8 is not intended to indicate that the method 800 is to include all of the components shown in FIG. 8. Further, the method 800 can include any number of additional components not shown in FIG. 8, depending on the details of the specific implementation.

Figure 9:
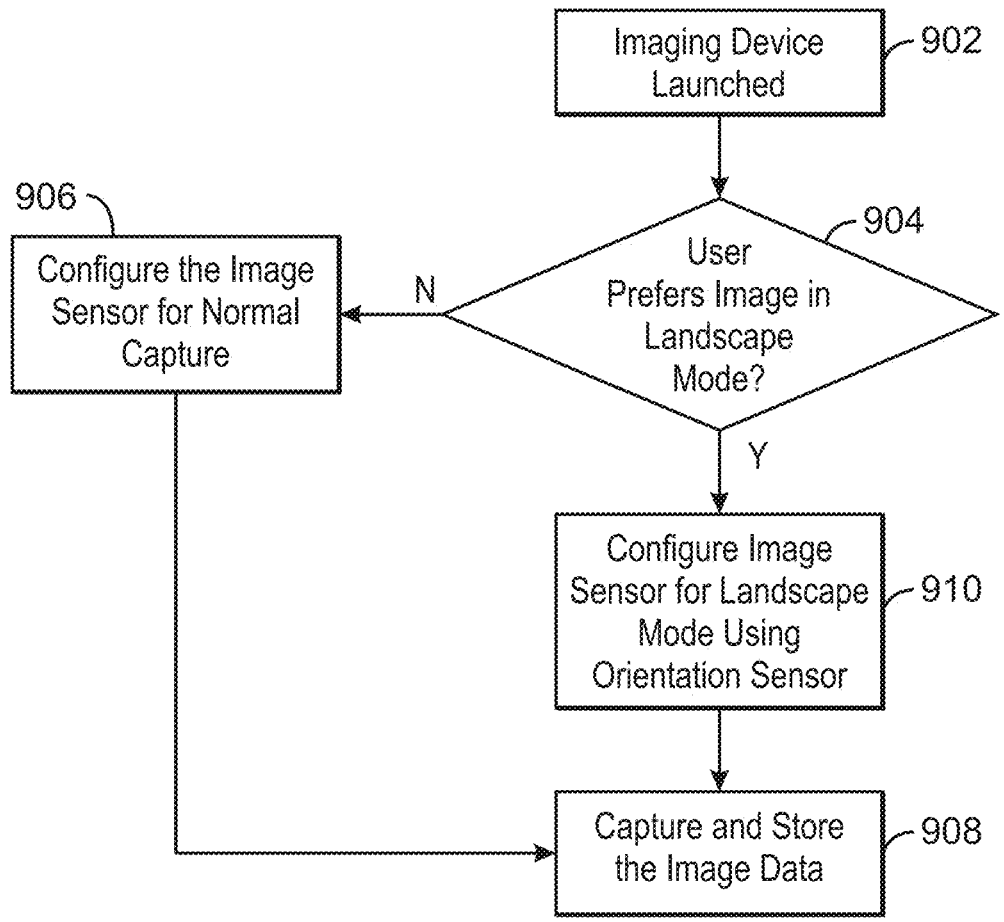
FIG. 9 is a process flow diagram of an example of another method of capturing image data.

FIG. 9 is a process flow diagram of an example of another method 900 of capturing image data. At block 902, an imaging device can be launched. The imaging device can be incorporated in a computing device, such as a smartphone or a tablet. For example, the imaging device can be launched by initiating an application installed on the computing device.

At block 904, the imaging sensor can determine if the user prefers an image in landscape mode. A user can configure the settings of the computing device to determine if an image data is captured in landscape format or if capture of the image data is determined by orientation of the computing device.

If the user does not prefer the image in landscape mode, at block 906, the image sensor can be configured for normal capture. Normal capture is a mode in which capture of image data is determined by orientation of the computing device including the image sensor. When the computing device is in landscape orientation, the image data is captured in landscape format and when the computing device is in portrait orientation, the image data is captured in portrait format. At block 908, the image data is captured and stored.

If the user does prefer the image in landscape mode, at block 910, the image sensor can be configured for orientation mode using the orientation sensor. The image sensor is configured to capture the image data in landscape format, regardless of the orientation of the computing device. The orientation sensor can be a sensor that collects environmental data to determine the orientation. For example, the orientation sensor can be a gyroscope, or any other suitable type of sensor. The image sensor can be configured based on the orientation of the computing device. For example, when the computing device is in landscape orientation, a first portion of the image sensor can be configured to capture the image data and when the computing device is in portrait orientation, a second portion of the image sensor can be configured to capture the image data. At block 908, the image data is captured and stored.

The process flow diagram of FIG. 9 is not intended to indicate that the method 900 is to include all of the components shown in FIG. 9. Further, the method 900 can include any number of additional components not shown in FIG. 9, depending on the details of the specific implementation.

Example 1

A computing device is described herein. The computing device includes an image sensor to capture image data and a processor to process the image data. The image sensor is to capture the image data in an orientation format irrespective of an orientation of the computing device.

The orientation can include a portrait orientation or a landscape orientation and wherein the orientation format comprises portrait orientation format or landscape orientation format. The image data can be a still-shot image data, video data, or a combination thereof. The image sensor can be a circular sensor. The image sensor can be a cross-shaped sensor. The image sensor can be a rectangular sensor and the sensor can be dynamically configured to capture image data in a landscape format. The image data captured by the image sensor can be viewed on a display device in landscape format. During capture of the image data, the computing device can be in portrait orientation and the image data can be captured in landscape format. The computing device can be an orientation sensor and the image sensor can be configured to capture the image data in a horizontal landscape format based on data collected by the orientation sensor.

Example 2

An image sensor is described herein. The image sensor is to capture image data in a landscape format, irrespective of an orientation of a computing device comprising the image sensor.

The image sensor can be a circular sensor to capture the image data in the landscape format. Upon playback of the image data, the image data is played in landscape format. The image sensor can be a cross-shaped sensor to capture the image data in landscape format. The image sensor can be a rectangular sensor and the image sensor can be dynamically configured to capture the image data in landscape format. The image sensor can be configured to capture the image data in a horizontal landscape format based on data collected by an orientation sensor. The image data captured by the image sensor is to be viewed on a display device in landscape format. The image data can be a still-shot image data, video data, or a combination thereof. The orientation of a computing device can be a portrait orientation or a landscape orientation. During capture of the image data, the computing device is in portrait orientation and the image data is captured in landscape format.

Example 3

A computing device is described herein. The computing device can include logic to receive, in an image sensor, a signal to capture image data and logic to determine an orientation of a computing device including the image sensor. The computing device also includes logic to configure the image sensor to capture the image data in landscape format. The computing device can further include logic to capture the image data in landscape format.

The computing device can include logic to determine a user preference for capturing the image data. The computing device can include logic to play back the image data in landscape format. The image sensor can be a rectangular sensor. The computing device can include logic to dynamically configure the image sensor to capture the image data in landscape format. The image sensor can be a circular sensor to capture the image data in a landscape format. The image sensor can be a cross-shaped sensor. Determining the orientation can include employing an orientation sensor to determine the orientation of the computing device. The orientation sensor can be a gyroscope. Configuring the image sensor can include configuring the image sensor to capture the image data in landscape format, irrespective of the orientation of the computing device. The computing device can further include logic to rotate the computing device during capture of the image data and logic to capture the image data in landscape format during rotation of the computing device. The computing device can be rotated 360 degrees during capture of the image data.

Example 4

A method is described herein. The method can include receiving, in an image sensor, a signal to capture image data. The method can also include determining an orientation of a computing device including the image sensor. The method can further include configuring the image sensor to capture the image data in landscape format and capturing the image data in landscape format.

The method can further include determining a user preference for capturing the image data. The method can further include playing back the image data in landscape format. The image sensor can be a rectangular sensor. The method can further include dynamically configuring the image sensor to capture the image data in landscape format. The image sensor can be a circular sensor to capture the image data in a landscape format. The image sensor can be a cross-shaped sensor. Determining the orientation can include employing an orientation sensor to determine the orientation of the computing device. The orientation sensor can be a gyroscope. Configuring the image sensor can include configuring the image sensor to capture the image data in landscape format, irrespective of the orientation of the computing device. The method can further include rotating the computing device during capture of the image data and capturing the image data in landscape format during rotation of the computing device. Rotating the computing device 360 degrees during capture of the image data.

Example 5

A method is described herein. The method can include means for receiving, in an image sensor, a signal to capture image data. The method can also include means for determining an orientation of a computing device including the image sensor. The method can further include means for configuring the image sensor to capture the image data in landscape format and means for capturing the image data in landscape format.

The method can further include means for determining a user preference for capturing the image data. The method can further include means for playing back the image data in landscape format. The image sensor can be a rectangular sensor. The method can further include means for dynamically configuring the image sensor to capture the image data in landscape format. The image sensor can be a circular sensor to capture the image data in a landscape format. The image sensor can be a cross-shaped sensor. Determining the orientation can include employing an orientation sensor to determine the orientation of the computing device. The orientation sensor can be a gyroscope. Configuring the image sensor can include configuring the image sensor to capture the image data in landscape format, irrespective of the orientation of the computing device. The method can further include means for rotating the computing device during capture of the image data and capturing the image data in landscape format during rotation of the computing device. Rotating the computing device 360 degrees during capture of the image data.

A tangible, non-transitory, computer-readable storage medium is described herein. The storage medium includes code to direct a processor to receive, in an image sensor, a signal to capture image data. The code also directs the processor to determine an orientation of a computing device including the image sensor. The code further directs the processor to configure the image sensor to capture the image data in landscape format and capture the image data in landscape format.

The code can further direct the processor to determine a user preference for capturing the image data. The code can further direct the processor to play back the image data in landscape format. The image sensor can be a rectangular sensor. The code can further direct the processor to dynamically configure the image sensor to capture the image data in landscape format. The image sensor can be a circular sensor to capture the image data in a landscape format. The image sensor can be a cross-shaped sensor. Determining the orientation can include employing an orientation sensor to determine the orientation of the computing device. The orientation sensor can be a gyroscope. Configuring the image sensor can include configuring the image sensor to capture the image data in landscape format, irrespective of the orientation of the computing device. The code can further include rotating the computing device during capture of the image data and directing the processor to capture the image data in landscape format during rotation of the computing device. Rotating the computing device 360 degrees during capture of the image data.

In the foregoing description and claims, the terms "coupled" and "connected," along with their derivatives, can be used. It should be understood that these terms are not intended as synonyms for each other. Rather, in particular embodiments, "connected" can be used to indicate that two or more elements are in direct physical or electrical contact with each other. "Coupled" can mean that two or more elements are in direct physical or electrical contact. However, "coupled" can also mean that two or more elements are not in direct contact with each other, but yet still co-operate or interact with each other.

Some embodiments can be implemented in one or a combination of hardware, firmware, and software. Some embodiments can also be implemented as instructions stored on a machine-readable medium, which can be read and executed by a computing platform to perform the operations described herein. A machine-readable medium can include any mechanism for storing or transmitting information in a form readable by a machine, e.g., a computer. For example, a machine-readable medium can include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "can", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases can each have a same reference number or a different reference number to suggest that the elements represented could be different and/or similar. However, an element can be flexible enough to have different implementations and work with some or all of the systems shown or described herein. The various elements shown in the figures can be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter can be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques can be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing device comprising:
   an image sensor to capture image data, wherein the image sensor comprises a cross-shaped sensor, wherein a first portion of the cross-shaped sensor is to capture image data when the computing device is in landscape orientation, and wherein a second portion of the cross-shaped sensor is to capture image data when the computing device is in portrait orientation; and
   a processor to process the image data.

2. The computing device of claim 1, wherein an orientation comprises the portrait orientation or the landscape orientation and wherein an orientation format comprises portrait orientation format or landscape orientation format.

3. The computing device of claim 1, wherein the image data comprises a still-shot image data, video data, or a combination thereof.

4. The computing device of claim 1, wherein the image sensor comprises a circular sensor.

5. The computing device of claim 1, wherein the image sensor comprises a rectangular sensor, and wherein the sensor is dynamically configured to capture image data in a landscape format.

6. The computing device of claim 1, wherein the image data captured by the image sensor is to be viewed on a display device in landscape format.

7. The computing device of claim 1, wherein during capture of the image data, the computing device is in portrait orientation and the image data is captured in landscape format.

8. The computing device of claim 1, wherein the computing device comprises an orientation sensor and wherein the image sensor is configured to capture the image data in a horizontal landscape format based on data collected by the orientation sensor.

9. An image sensor, comprising:
   a cross-shaped sensor, wherein a first portion of the cross-shaped sensor is to capture image data when a computing device comprising the cross-shaped sensor is in landscape format, and wherein a second portion of the cross-shaped sensor is to capture image data when the computing device is in portrait format.

10. The computing device of claim 9, wherein the image sensor comprises a circular sensor to capture the image data in the landscape format.

11. The computing device of claim 9, wherein upon playback of the image data, the image data is played in landscape format.

12. The computing device of claim 9, wherein the image sensor comprises a rectangular sensor and wherein the image sensor is dynamically configured to capture the image data in landscape format.

13. The computing device of claim 9, wherein the image sensor is configured to capture the image data in a horizontal landscape format based on data collected by an orientation sensor.

14. The computing device of claim 9, wherein the image data captured by the image sensor is to be viewed on a display device in landscape format.

15. The computing device of claim 9, wherein the image data comprises a still-shot image data, video data, or a combination thereof.

16. A computing device, comprising:
    logic to receive, in an image sensor comprising a cross-shaped sensor, a signal to capture image data;
    logic to determine an orientation of a computing device comprising the cross-shaped sensor;
    logic to configure a first portion of the cross-shaped sensor to capture the image data when the computing device is in landscape format; and
    logic to configure a second portion of the cross-shaped sensor to capture the image data when the computing device is in portrait format.

17. The computing device of claim 16, further comprising determining a user preference for capturing the image data.

18. The computing device of claim 16, further comprising playing back the image data in landscape format.

19. The computing device of claim 16, wherein the image sensor comprises a rectangular sensor.

20. The computing device of claim 19, further comprising dynamically configuring the image sensor to capture the image data in landscape format.

21. The computing device of claim 16, wherein the image sensor comprises a circular sensor to capture the image data in the landscape format.

22. The computing device of claim 16, determining the orientation comprising employing an orientation sensor to determine the orientation of the computing device.

23. The computing device of claim 22, wherein the orientation sensor comprises a gyroscope.

24. The computing device of claim 16, configuring the image sensor comprising configuring the image sensor to capture the image data in landscape format, irrespective of the orientation of the computing device.

25. The computing device of claim 16, further comprising rotating the computing device during capture of the image data and logic to capture the image data in landscape format during rotation of the computing device.

26. The computing device of claim 25, comprising rotating the computing device 360 degrees during capture of the image data.

* * * * *